A. M. GOW.
DUMP CAR.
APPLICATION FILED JULY 26, 1916.

1,251,770.

Patented Jan. 1, 1918.
3 SHEETS—SHEET 1.

Witnesses:

Inventor
Alex. M. Gow
By _____
Atty.

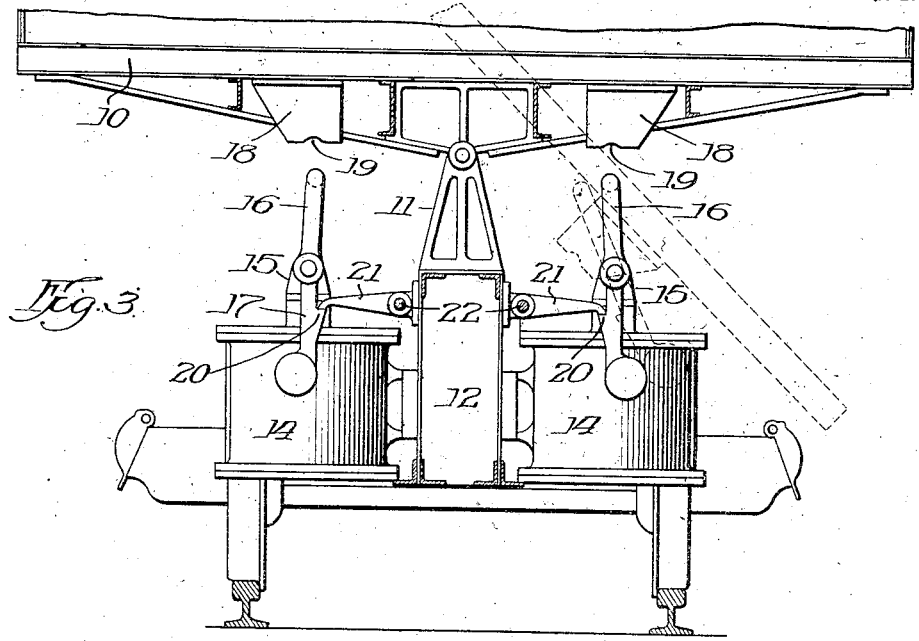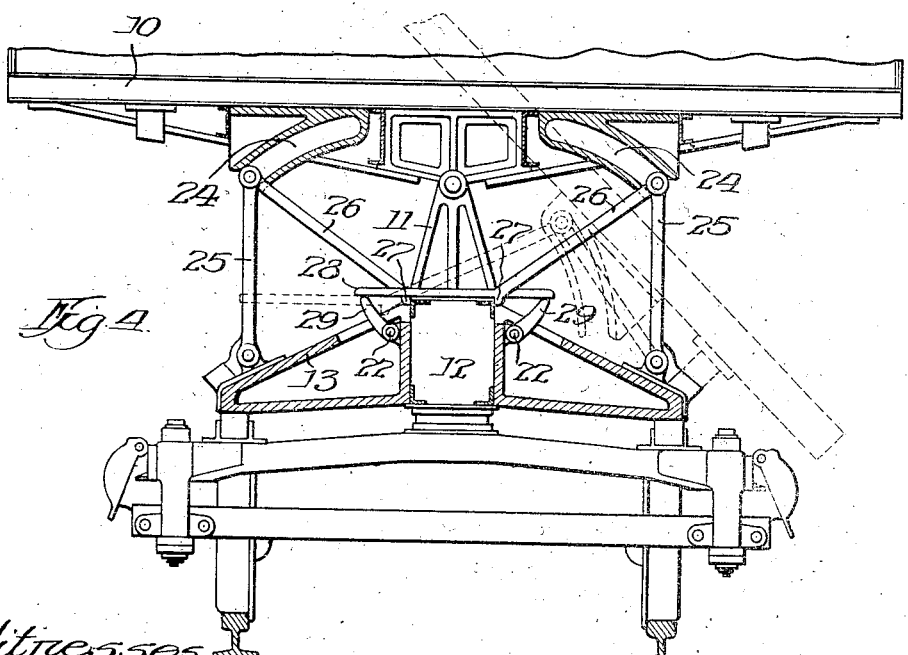

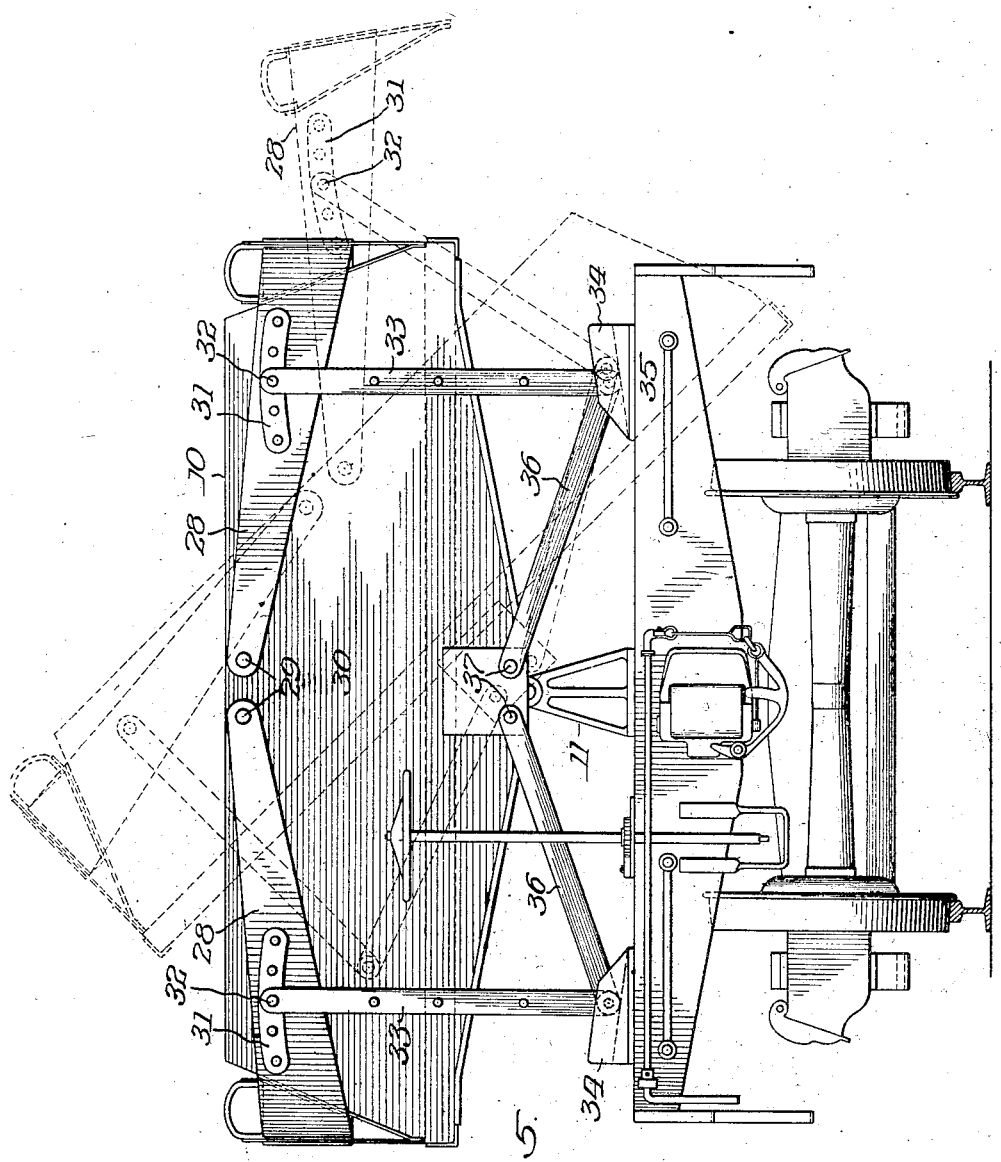

UNITED STATES PATENT OFFICE.

ALEXANDER M. GOW, OF DULUTH, MINNESOTA.

DUMP-CAR.

1,251,770.   Specification of Letters Patent.   Patented Jan. 1, 1918.

Application filed July 26, 1916. Serial No. 111,332.

*To all whom it may concern:*

Be it known that I, ALEXANDER M. GOW, a citizen of the United States, and resident of Duluth, in the county of St. Louis and State of Minnesota, have invented certain new and useful Improvements in Dump-Cars, of which the following is a specification.

My invention relates to railway cars and has particular reference to a novel side dump car.

My invention comprises a dump car of that type wherein a body adapted to dump on either side is supported by hinge castings upon a car frame which carries upright dumping cylinders actuated by compressed air. The car is equipped with locking mechanism to secure the body in a horizontal position. This locking mechanism is disengaged by the first few inches of the motion of the operating piston, which then engages the bottom of the car body and dumps it. The body is righted to the horizontal position by the operating piston on the other side. The locking mechanism prevents the car body, upon being righted, from passing the horizontal position and dumping on the other side.

Owing to the high center of oscillation and high center of gravity of the load, the tendency of the car body to rock from side to side is very great. In most cars of this type this rocking motion is checked by chains secured between the car body and the body bolster of the frame. In certain makes of cars, tension members forming part of the locking mechanism are used to check this rocking motion. In my design compression members are used between the body of the car and the body bolster of the frame, and these members constitute part of the locking mechanism. There is a very decided mechanical advantage in using compression as against tension members for this purpose. The strain incident to this rocking motion must be absorbed by the truck springs on the side toward which the body rocks. The outer end of the body bolster rests upon the truck springs. Compression members located between the ends of the body bolsters and the car body would transmit the strain directly; and such compression members would be displaced on the side toward which the car is dumped and replaced when the car is righted.

My invention involves a new and advantageous method of displacing and replacing these compression members. Two distinct functions are performed by the upward motion of the piston in the operating cylinder. The first four inches of upward motion serve to disengage the locking mechanism on the opposite side of the car. The remainder of the travel serves to tip the car body over, the compression members then being free to fold out of the path of travel of the body. When by the action of the piston in the opposite cylinders the car body is righted, the compression members are automatically restored to their upright positions. The means by which I unlock, cause to fold up, and then replace these members constitutes an important feature of my invention. The service these cars receive is very severe and because of wear and distortion they quickly get out of adjustment. This is particularly true of the door operating mechanism. The weight of the door is an important factor in returning the car to its loading position after dumping. It is desirable that in both dumping and righting there should be as little jar as possible. The slamming of the body going over and back is very severe on the cars and on the track. It is possible by adjusting the balance of the door to materially reduce this slamming action, which in an improperly balanced car can be so severe as to move the track or raise the wheels from the track. I make provision for adjustment of the door in two places so that the door may be set to balance the body to best advantage and also that wear and distortion may be compensated for.

In the operation of these cars a wide latitude must be provided for in the application of the air. Upon the locomotive handling the train is provided a supply of compressed air. The engineer should be able to dump and right the entire train to either side from the locomotive: or any one car must be capable of being dumped and righted singly; or one or more cars may be dumped to one side and the remainder to the other side. It is also very desirable that each car may be dumped and righted from one side. In most cases it is dangerous for a man to be on the side toward which the car dumps. Furthermore, in order to avoid mistakes or confusion the operating levers, controlling the air supply on each side of the car, should be alike so that there be no danger of a man's dumping the car toward him.

Referring now to the drawings:

Fig. 3 is an end elevation showing the dumping cylinders;

Fig. 4 is a vertical section showing the locking mechanism in end elevation; and Fig. 5 shows the end of the car and the door operating mechanism.

Figure 1:
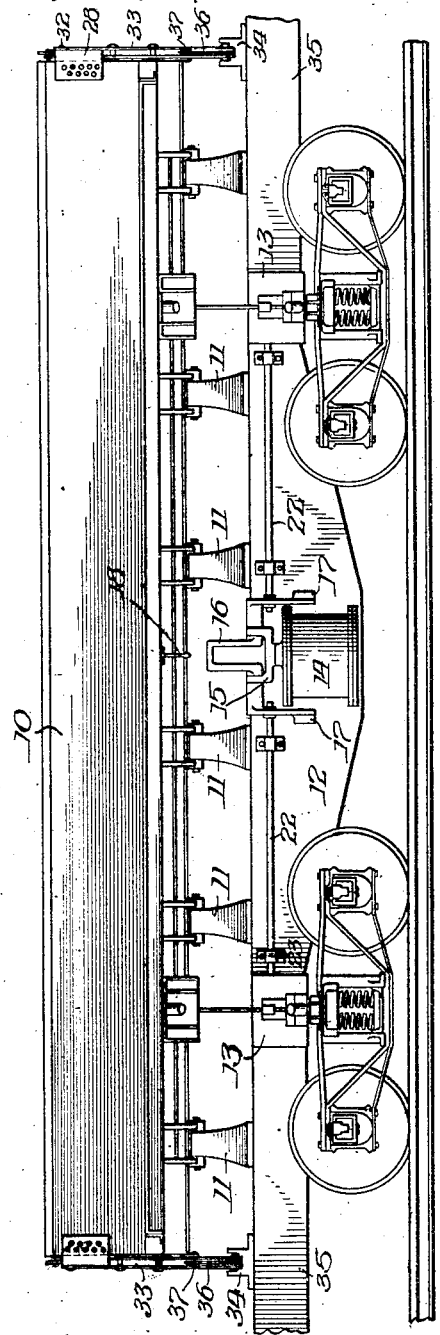
Figure 1 shows a side elevation of the car.

Referring to Fig. 1: The car body 10 is supported on hinge castings 11—11, secured to the frame 12. Body bolsters 13—13 are secured to the frame 12 and are carried by the trucks in the usual manner. Air cylinders 14, shown also in Fig. 3, are secured to the frame 12. These cylinders are equipped with pistons and piston rods, not shown. To the top of each piston rod is secured a yoke 15, carrying a swinging member composed of an upper part 16 and a lower part 17. To the car body 10 is secured the push block 18, having a depression 19 adapted to engage the upper end of part 16. On the inside surface of the part 17 is a lug 20 adapted to engage the arm 21, secured to the shaft 22. As shown in Fig. 1, shaft 22 is supported by bearings 23—23 and extends into the body bolster 13.

In Fig. 4 is shown the locking mechanism. To the car body 10 is secured the hollow guide casting 24, adapted to receive the upper ends of the two compression members 25 and 26. Member 25 is pivoted to the body bolster 13, while member 26 butts at its lower end against car frame 12, by means of the lug 27. From lug 27 the arm 28 extends across the car frame and projects on the opposite side. To the end of shaft 22 is secured the dog 29 in contact with and beneath the arm 28. The operation is as follows: When the left hand piston 14, in Fig. 3, receives air, the yoke 15 rises and the shaft 22 is rotated by means of the arm 21 and the lug 20. This disengages lug 27 from the frame 12 and unlocks the locking mechanism on the side opposite. As the piston rises further, the member 16 engages the notch 19 on the push block 18 and the car body 10 begins to dump. As it descends, the push block 18 strikes member 16 at an angle, and, as it is free to swing, it assumes the position shown by the dotted lines. At the same time the compression members 25 and 26 have, by means of guide casting 24, been guided to the position shown by dotted lines, and the car is dumped. In this position push block 18, rests upon the center of the yoke 15, over the upper ends of the piston rod. Inasmuch as member 16, is shaped like an inverted U, the push-block enters the space between the two legs of the member. The air having been released from left-hand cylinder 14, it is turned into right-hand cylinder 14. Yoke 15, bearing on the push block 18, rises and forces the low side of the car body upward. It is not necessary or desirable that the car body shall be pushed clear up to the horizontal position, for it is so balanced that only a few inches of travel of the piston are required to overcome the tendency of the body to remain in the dumped position, when it resumes a horizontal position without further assistance. As the car body is righted, guide casting 24, restores the members 25 and 26 to their former position; lug 27 drops over the edge of the frame 12, and the car body is locked in the horizontal position. It will be seen that when the car is in the dumped position, the lug 20, on member 17, is out of engagement with the arm 21, on the side upon which the car is dumped, because of the angular position, as shown by dotted lines, of the swinging member composed of the upper part 16, and the lower part 17. When, therefore, the piston starts to rise to right the car, the shaft 21, is not rotated, and the locking mechanism on the opposite side is not disengaged. If it was the momentum of the body would cause it to pass the horizontal position and dump on the other side. Air being released from the left-hand cylinder 14, the piston rod, yoke and members 16 and 17, descend by gravity and all parts assume the position shown in Figs. 3 and 4 and the car is locked in the horizontal position.

Referring to Fig. 5, showing the end of the car and door mechanism: To the door 10 is rigidly secured a plate 28 pivoted on a pin 29, secured to the end of the car 30. To plate 28 is secured arc member 31 provided with a series of holes to engage pin 32 in upper end of the door lifting rod 33. The lower end of the rod 33 rests on the wedge 34, adjustably supported by the end sill 35. The connecting rod 36 is pivoted to the bottom end of the lifting rod 33 and has its inner end pivoted to the end of the car by the pin 37. The purpose of wedge 34 is to provide vertical adjustment for the lifting rod 33. A certain amount of slack or lost motion is necessary in this door rigging. The ordinary rocking of the car body must not raise the door. The car body must be able to tip sidewise a few inches without the door lifting mechanism coming into action. It is desirable that wear and distortion should be compensated for and this I do by means of the wedge 34.

In the position shown by dotted lines the car has been dumped. The weight of the door is carried on the pin 32. It is evident that the leverage the door exerts depends on the position of pin 32 in plate 28. By making the position of pin 32 adjustable, I am able to adjust to the most desirable point this leverage and control the motion of the body in righting and also prevent the body going back of its own accord when the load is discharged. Furthermore, this adjustment enables me to control the height to which the door shall be raised.

Figure 2:
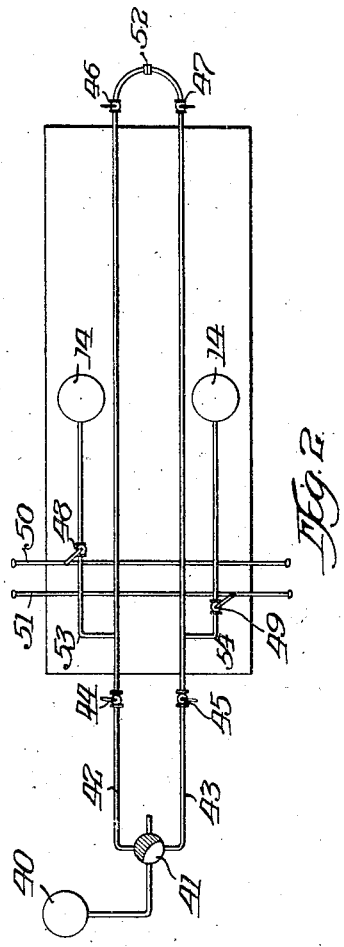
Fig. 2 shows diagrammatically the arrangement of air piping.

Referring now to Fig. 2, wherein the piping is shown diagrammatically: On the locomotive is the reservoir 40, containing compressed air furnished by the air pump in the usual manner. The four way valve 41 is adapted to give air to either pipe line 42 or 43, furnishing air to the dumping cylinders. The usual cut-out cocks 44—45—46—47 are installed on these air lines. By means of the hose coupling 52, air lines 42 and 43 may be coupled together on the last car of the train. From line 42 is taken the branch line 53 leading to the air cylinder on that side of the car, and from line 43 is taken the branch line 54 leading to the air cylinder on its side of the car. Branch line 53 is controlled by dump cock 48, operated by rod 50, and branch line 54 is controlled by the dump cock 49, operated by the rod 51. Rods 50 and 51 extend clear across the car and can be operated from either side. Suppose it is desired that the entire train shall be dumped and righted from the engine. Dump cocks 48 and 49 are set to the open position in a counter clockwise movement, as shown in Fig. 2 by pushing the left hand rod and pulling the right hand rod on either side of the car. Cut-out cocks 44 and 45 are set to the open position on each car. Valve 41 on the engine is set to the closed position. To dump, the engineer throws air on either line 42 or 43 and the cars dump to the opposite side. He then throws air on the other line and the train rights. Suppose it is desired to operate the cars one at a time, independent of the engineer. Cut-out cocks 46 and 47 are opened and valve 41 on the engine is set in the position shown. Both air lines 42 and 43 are now under pressure. Dump cocks 48 and 49 are closed. Now push the left hand rod and any car dumps from the operator. Pull the right hand rod and the car rights toward the operator.

Suppose it is desired to "spot" and dump several cars at one place and then move the train and dump the remainder at the same place. To avoid the danger from leaking of cocks 48 and 49, it is preferable that in transit the air lines 42 and 43 be not under pressure. Consequently valve 41 is closed. Cut-out cocks 46 and 47 on the last car are closed. When the cars are "spotted", push the left hand rods on the cars to be dumped. Signal the engineer to throw air on the line on the side where the operator is. Should he make a mistake no harm is done, for the other dumping cocks are closed. The cars dump. Now pull the right hand rods and signal the engineer to throw air on the other line and the cars right. It will be understood that these cars are operated at night, in bad weather by men of very ordinary intelligence. In addition, it is a serious matter to dump a car the wrong way, and a "fool-proof" and safe arrangement of the operating rods is absolutely necessary for the successful operation of the trains. My arrangement gives the desired flexibility of operation, makes both sides of the car alike, and to any man can be explained that if he pushes the left hand rod the car will go from him and if he pulls the right hand rod the car will go toward him. It is obvious that this arrangement could be reversed without changing the principle involved.

I claim:

1. In a dump car, the combination of a car frame, a car body mounted for oscillation thereon and having guiding means, and a releasable member for normally holding the car body in an upright position and coöperating with said guiding means whereby said member is moved by said guiding means to a holding position when the car body is moved toward an upright position.

2. In a dump car, the combination of a car frame, a car body mounted for oscillation thereon and having guiding means, and a releasable member for normally holding the car body in an upright position and coöperating with said guiding means whereby said member is automatically moved by said guiding means to a holding position when the car body is moved toward an upright position.

3. In a dump car, the combination of a car frame, a car body mounted for oscillation thereon and having a guideway, and a releasable member for normally holding the car body in an upright position and movable in said guideway whereby said member is moved to holding position when the car body is moved toward an upright position.

4. In a dump car, the combination of a car frame, a car body mounted for oscillation thereon and having oppositely arranged arcuate guideways, and oppositely arranged releasable members for normally holding the car body in an upright position and being movably mounted in said guideways whereby said members are moved to a holding position when the car body is moved toward an upright position.

5. In a dump car, the combination of a car frame, a car body mounted for oscillation thereon and having a slotted guideway, two pivotally connected members connected at a point adjacent said guideway, one of said members being pivotally connected to the frame and the other of said members being releasably connected to the frame to hold the car body in an upright position.

6. In a dump car, the combination of a car frame, a car body mounted for oscillation thereon and having a slotted guideway, two pivotally connected members connected at a point adjacent said guideway, one of said members being pivotally connected to the frame and the other of said members being releasably connected to the frame to hold the car body in an upright position, and means for releasing the releasable member to permit the car body to move to a dumping position.

7. In a dump car, the combination of a car frame, a car body mounted for oscillation thereon and having a guideway, two pivotally connected members connected at a point adjacent said guideway, one of said members being pivotally connected to the frame and the other of said members being releasably connected to the frame to hold the car body in an upright position, and means for releasing the releasable member to permit the car body to move to a dumping position, said guideway returning said second member to a position to hold the car body in an upright position.

8. In a dump car, the combination of a car frame, a car body pivoted on said frame, a pair of cylinders for causing the oscillation of said car body as required to dump the load on either side and to right the body after dumping the load, vertical struts located at each side of the pivot and extending between said frame and said body, said struts having their lower ends pivoted to the car frame, guide castings on said car body adapted for controlling the movement of the upper ends of said struts, links pivotally connected to the upper ends of said struts and normally releasably engaging the car frame for normally maintaining said struts and car body in a vertical position, and means whereby an actuation of one of said air cylinders will disengage one of said links from said car frame to permit the car body to move into a dumping position.

9. In a dump car, the combination of a frame, a body pivoted to said frame, a pair of struts located one on each side of the pivot point of said body, the lower end of said struts having a fixed pivot on the frame, the upper end of said struts being adapted for movement in a confined arcuate space, means in the form of a rigid link for maintaining each of said struts in a vertical position, and a trip for operating said last-named means, substantially as described.

Signed at Duluth, Minn., this 21 day of July, 1916.

ALEXANDER M. GOW.

Witnesses:
D. B. CLARK,
J. E. CARLSON.